US012624591B2

(12) United States Patent
Kaczmarski et al.

(10) Patent No.: US 12,624,591 B2
(45) Date of Patent: May 12, 2026

(54) BOX STRUCTURE BUILDING PARTITION

(71) Applicant: FAKRO PP Sp. z o. o., Nowy Sacz (PL)

(72) Inventors: Bernard Kaczmarski, Piwniczna Zdroj (PL); Boguslaw Kasinski, Limanowa (PL); Bartlomiej Mos, Nawojowa (PL)

(73) Assignee: FAKRO PP Sp. z o. o., Nowy Sacz (PL)

( * ) Notice: Subject to any disclaimer, the term of this patent is extended or adjusted under 35 U.S.C. 154(b) by 466 days.

(21) Appl. No.: 18/230,180

(22) Filed: Aug. 4, 2023

(65) Prior Publication Data

US 2024/0068295 A1 Feb. 29, 2024

(30) Foreign Application Priority Data

Aug. 29, 2022 (PL) ........................................ 442139

(51) Int. Cl.

*E06B 5/01* (2006.01)
*E04B 9/00* (2006.01)
*E04F 11/06* (2006.01)

(52) U.S. Cl.

CPC ................ *E06B 5/01* (2013.01); *E04B 9/003* (2013.01); *E04F 11/066* (2013.01)

(58) Field of Classification Search

CPC ......... E04B 9/003; E04F 11/066; E04F 11/06; E04F 11/022; E06B 5/01; E06C 1/383; E05B 5/00; E05B 65/006; E05B 63/22; E05B 2015/0431; E05B 73/0005; E05B 15/025; E05B 17/2011; E05C 19/10; E05C 17/025; E05C 3/045; E05C 17/085

See application file for complete search history.

(56) References Cited

U.S. PATENT DOCUMENTS

| | | | | | |
|---|---|---|---|---|---|
| 340,743 | A * | 4/1886 | Walker | E05B 5/00 | 292/35 |
| 1,219,697 | A * | 3/1917 | Bessler | E04F 11/04 | 182/79 |
| 1,898,520 | A * | 2/1933 | Barraclough | E04F 11/066 | 182/98 |

(Continued)

FOREIGN PATENT DOCUMENTS

| | | | | |
|---|---|---|---|---|
| DE | 2458788 | A1 * | 9/1976 | |
| DE | 202022103229 | U1 * | 6/2022 | E05B 5/006 |

(Continued)

*Primary Examiner* — Brian D Mattei

*Assistant Examiner* — Kathleen M. McFarland

(74) *Attorney, Agent, or Firm* — Bayramoglu Law Offices LLC

(57) ABSTRACT

A box structure building partition constructed out of box designed to be installed in a building partition, articulated relative to box closing hatch, wherein the box structure features a closing hatch locking mechanism in the box and closing hatch features bracket in closing hatch socket for unlocking the locking mechanism, wherein bracket assumes two extreme positions in closing hatch, so that bracket in the first extreme position is retracted into closing hatch and the locking mechanism is locked and in the second extreme position bracket is slid out from closing hatch and the locking mechanism is unlocked and the bracket features a coupling for coupling element, accessible for a user when bracket is not in its first extreme position.

17 Claims, 5 Drawing Sheets

(56) References Cited

U.S. PATENT DOCUMENTS

| | | | | | |
|---|---|---|---|---|---|
| 3,428,350 | A * | 2/1969 | Trammell, Jr. | E05B 79/20 | 292/336.3 |
| 4,076,102 | A * | 2/1978 | Desarzens | E04F 11/066 | 182/157 |
| 4,553,365 | A * | 11/1985 | Bechstein | E04B 9/26 | 52/506.06 |
| 4,752,091 | A * | 6/1988 | Jackson | E05C 3/122 | 292/191 |
| 4,916,862 | A * | 4/1990 | Storer | E05C 17/36 | 49/386 |
| 5,595,028 | A * | 1/1997 | Handzlik | E04B 9/003 | 52/39 |
| 8,028,804 | B2 * | 10/2011 | Lair | E06C 1/12 | 182/78 |
| 8,616,592 | B2 * | 12/2013 | Kitada | E05C 3/30 | 292/336.3 |
| 8,997,411 | B2 * | 4/2015 | Whitten | E04F 11/064 | 52/183 |
| 9,540,824 | B1 * | 1/2017 | Sandburg | E06C 9/08 | |
| 10,711,465 | B2 * | 7/2020 | Nielsen | E04B 9/003 | |
| 10,808,448 | B2 * | 10/2020 | Yu | E05G 1/04 | |
| 12,503,861 | B2 * | 12/2025 | Kasinski | E04F 11/064 | |
| 2007/0140827 | A1 * | 6/2007 | Blanchard | E04F 11/064 | 180/9.22 |
| 2008/0060874 | A1 * | 3/2008 | Lair | E04F 11/064 | 182/77 |
| 2009/0115198 | A1 * | 5/2009 | Kitada | E05C 3/30 | 292/198 |
| 2012/0199417 | A1 * | 8/2012 | Richey | E06C 1/383 | 182/129 |
| 2015/0013240 | A1 * | 1/2015 | Malakauskas | E04C 2/46 | 52/79.9 |
| 2015/0047273 | A1 * | 2/2015 | Whitten | E04F 11/06 | 52/741.2 |
| 2018/0320407 | A1 * | 11/2018 | Mason | E05B 79/20 | |
| 2019/0211609 | A1 * | 7/2019 | Yu | E05B 65/0075 | |
| 2019/0277037 | A1 * | 9/2019 | Nielsen | E04B 9/003 | |
| 2021/0108454 | A1 * | 4/2021 | Boyer | E05C 3/162 | |
| 2023/0304294 | A1 * | 9/2023 | Kasinski | E04F 11/064 | |
| 2023/0323706 | A1 * | 10/2023 | Zak | E05B 15/10 | 70/77 |
| 2024/0068295 | A1 * | 2/2024 | Kaczmarski | E04F 11/022 | |
| 2025/0116115 | A1 * | 4/2025 | Kaczmarski | E04F 11/062 | |

FOREIGN PATENT DOCUMENTS

| | | | |
|---|---|---|---|
| PL | 227158 | B1 | 11/2017 |
| PL | 233210 | B1 | 9/2019 |

* cited by examiner

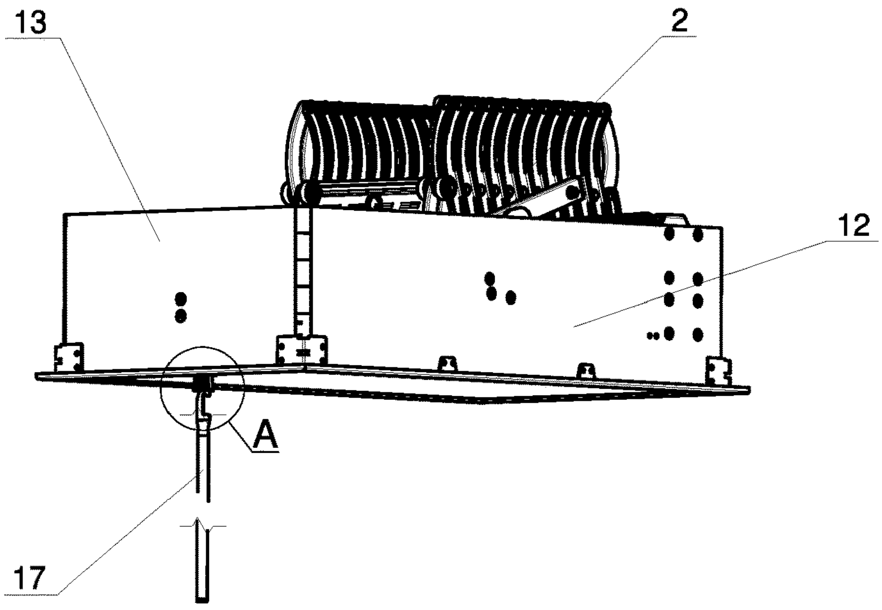
FIG. 6A
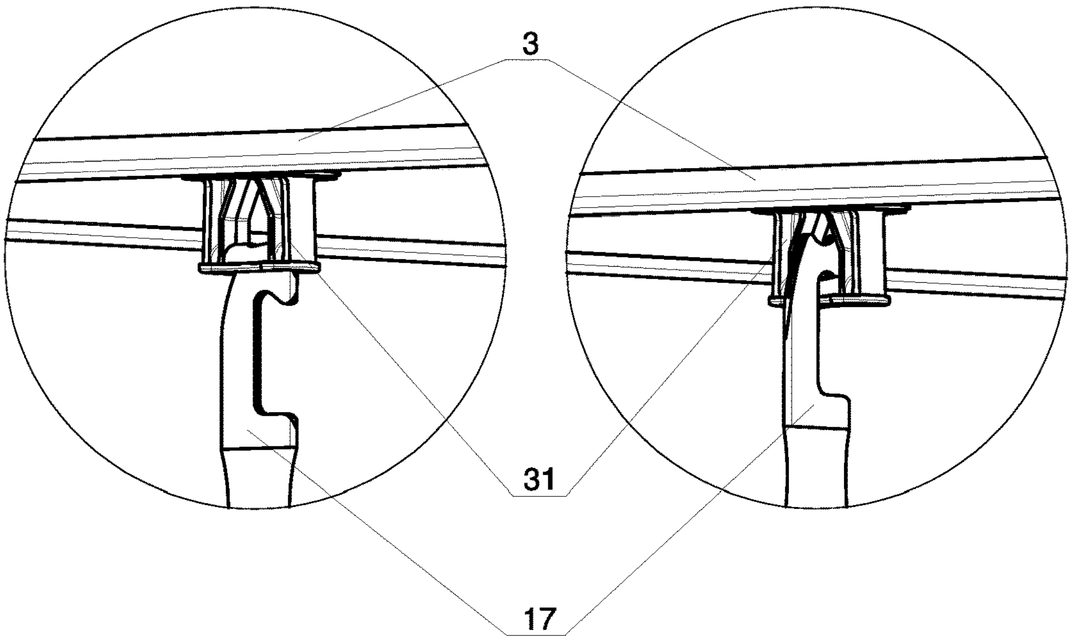
FIG. 6B
FIG. 6C

BOX STRUCTURE BUILDING PARTITION

CROSS REFERENCE TO THE RELATED APPLICATIONS

This application is based upon and claims priority to Polish Patent Application No. 442139, filed on Aug. 29, 2022, the entire contents of which are incorporated herein by reference.

TECHNICAL FIELD

The invention pertains to a box structure building partition particularly of attic stairs with a closing hatch locking mechanism in the box of the structure and a bracket to unlock the locking mechanism.

BACKGROUND

Attic stairs comprising a ladder comprising a first segment, a second segment and a third segment and comprising a box attached in a ceiling opening of a room have been disclosed under US2012199417A1. Attic stairs may be remote controlled and to that end the stairs include a prime mover which comprises a lifting cable attached to the first and second ladder segments so that after a remote control signal has been received, the lifting cable rotates the second ladder segment toward the first segment. Then the third ladder segment rotates toward the bottom of the second ladder segment until the second and third segments are on the first ladder segment. The attic stairs also include an attic stairs drive system motor release assembly which facilitates safe manual opening of the attic stairs in the event of a power supply interruption. The motor release assembly works with a release cable which has to be pulled in order to disengage the motor. Then the ladder may be unfolded manually by a user, and the counterbalance springs mechanism prevents the ladder from opening uncontrollably.

ATTIC GROUP supplies FANELEC electric attic stairs with an emergency manual opening function in the event of a power failure. The stairs include a cable which passes through attic stairs closing hatch. One end of the cable is fastened to the hatch whereas the other end is attached to the motor drive system disengagement assembly. The hatch features a coupling for the end of the cable, which, once slid out from the hatch, tensions the cable causing the motor to be disengaged.

SUMMARY

The aim of the invention is a box structure building partition according to patent claim 1, and in particular attic stairs. The box structure is constructed out of a box, designed to be installed in a building partition, closed from the bottom by a closing hatch, wherein the closing hatch is articulated relative to the box. The locking mechanism locks movement of the closing hatch relative to the box, which may then be unlocked using a bracket. The aforementioned bracket assumed two extreme positions in the closing hatch, so that in the first extreme position the bracket is retracted into closing hatch socket and the locking mechanism is locked. In the second extreme position the bracket slides out of the closing hatch socket and the locking mechanism is unlocked. The bracket also features a coupling for a coupling element, accessible to a user, when the bracket is out of its first extreme position. Inserting and extracting the bracket into and out of the closing hatch socket is performed using the coupling element, and in particular a rod. For that purpose, the bracket features a contact surface, accessible in every bracket position, so that when the end of the coupling element comes into contact with the contact surface the bracket moves between its first and second extreme positions in the closing hatch socket. Preferably the contact surface is a cavity for the end of the coupling element. At least a part of the bracket external surface and closing hatch socket surface which holds the bracket are threaded, and movement of the bracket between its two extreme positions takes place by screwing the bracket in or out of the closing hatch socket using the coupling element which is in contact with the bracket contact surface. Preferably the closing hatch socket for the bracket features a nut for the threaded part of the bracket. The bracket comprises a base which divides the bracket into the threaded part and the part with the coupling for the coupling element and in particular for a rod, wherein the base in the second extreme position of the bracket is flush with the closing hatch external surface. Preferably the part with the coupling comprises an opening, into which the end of the coupling element is inserted, and the closing hatch may be lowered whilst opening the box structure when the locking mechanism is unlocked. The base also features stop faces working together with closing hatch socket stop faces, which guide the bracket to the first extreme position when the bracket is being inserted into the said socket. The closing hatch locking mechanism comprises a box structure drive system subassembly which comprises at least a coupler and a coupler cable fastened to the closing hatch bracket. With the closing hatch bracket out of the first extreme position, the drive system is decoupled, and the locking mechanism is unlocked. There is an opening in the bracket for the coupler cable terminating with a ferrule or a knot to prevent the cable from slipping out of the bracket. The drive system which moves the closing hatch relative to the box structure also includes an actuator powered by an electric motor and a transmission. Drive system operation is controlled by a remote control. In another embodiment the locking mechanism comprises a box structure lock and the closing hatch bracket out of the first extreme position retracts the box structure lock locking bolt so that the locking mechanism is in an unlocked position. According to the invention, the box structure building partition in the form of attic stairs also includes a foldable ladder, preferably a concertina ladder, which is suspended from the attic stairs box using the ladder base. Two ladder base ends are suspended in bearings seated on ladder base assembly bases mounted on attic stairs box side walls. The assembly bases are mounted to the box using mounting screws. Preferably the closing hatch features a layer construction with a layer of insulation material between two rigid layers. Brackets for top and bottom closing hatch suspension flat bars are mounted to the closing hatch rigid layer. Top suspension flat bars, with the attic stairs open, are closer to the box than the bottom suspension flat bars. A load bearing frame is between the closing hatch and the ladder. Its lateral upper stile also constitutes the ladder base. Whereas the load bearing frame is supported by a support beam suspended using tie-rods from attic stairs box side walls. When the bracket assumes the first extreme position, where it is retracted into the closing hatch socket and the attic stairs drive system is coupled, the attic stairs may be opened automatically using the drive system operated remotely by a remote control for example. In the second extreme position, the bracket slides out from the closing hatch socket, the locking mechanism coupler cable becomes tight and results in a decoupling of the drive system. This disengages the motor and the stairs may be opened manually. With the bracket in between its two extreme positions, and in particular after the bracket completely slides out from the closing hatch, an opening becomes accessible in the part with the coupling for the coupling element end in the form of attic stairs bar hook. The threaded connection between the bracket and the closing hatch dictates bracket behaviour in any position, so that it does not return to its first extreme position and neither does it fall out from the closing hatch. The bracket may be screwed in or out using the bar, where its external hook side enters the bracket cavity constituting its contact surface, accessible for the coupling element in all bracket positions. Attic stairs drive system actuator is suspended on a load bearing beam attached to attic stairs box side walls on assembly bases attached to box side walls. The load bearing beam is above the ladder base. The closing hatch is suspended from the load bearing frame via bottom suspension flat bars, and from the load bearing beam via top suspension flat bars. The attic stairs also include a half-frame in the load bearing frame. The half-frame is constructed out of side stiles and a half-frame lateral stile. The half-frame side stiles are attached telescopically to the load bearing frame and to the ladder, so that during attic stairs opening and closing the half-frame can rotate relative to the load bearing frame and relative to the ladder. The aforementioned drive system, preferably an actuator powered by an electric motor, is located between the load bearing beam it is attached to and the half-frame lateral stile, wherein the coupling element located between the drive system and the half-frame lateral stile changes the position of the ladder relative to the load bearing frame as a result of drive system operation. Preferably the coupling element is in the shape of a hook. Drive system operation is preferably controlled by a remote control.

Use of the closing hatch locking mechanism disengagement bracket in the building partition box structure makes it possible to open and close the box closing hatch by unlocking the locking mechanism. In cases where the box structure features a drive system and there is no power supply, the box structure may be opened manually using a bar which is compatible with the multi-function bracket in the closing hatch. Thus, the solution ensures convenient and safe box structure opening and closing in the event of a power supply interruption.

BRIEF DESCRIPTION OF THE DRAWINGS

The illustration depicts the attic stairs, with given figures depicting the following:

FIG. 6A shows attic stairs with the bar in the bracket;

FIG. 6B is an enlarged view A of attic stairs depicted on FIG. 6A, with the bar in the bracket cavity;

FIG. 6C shows a bar in the bracket opening.

DETAILED DESCRIPTION OF THE EMBODIMENTS

Figure 1:
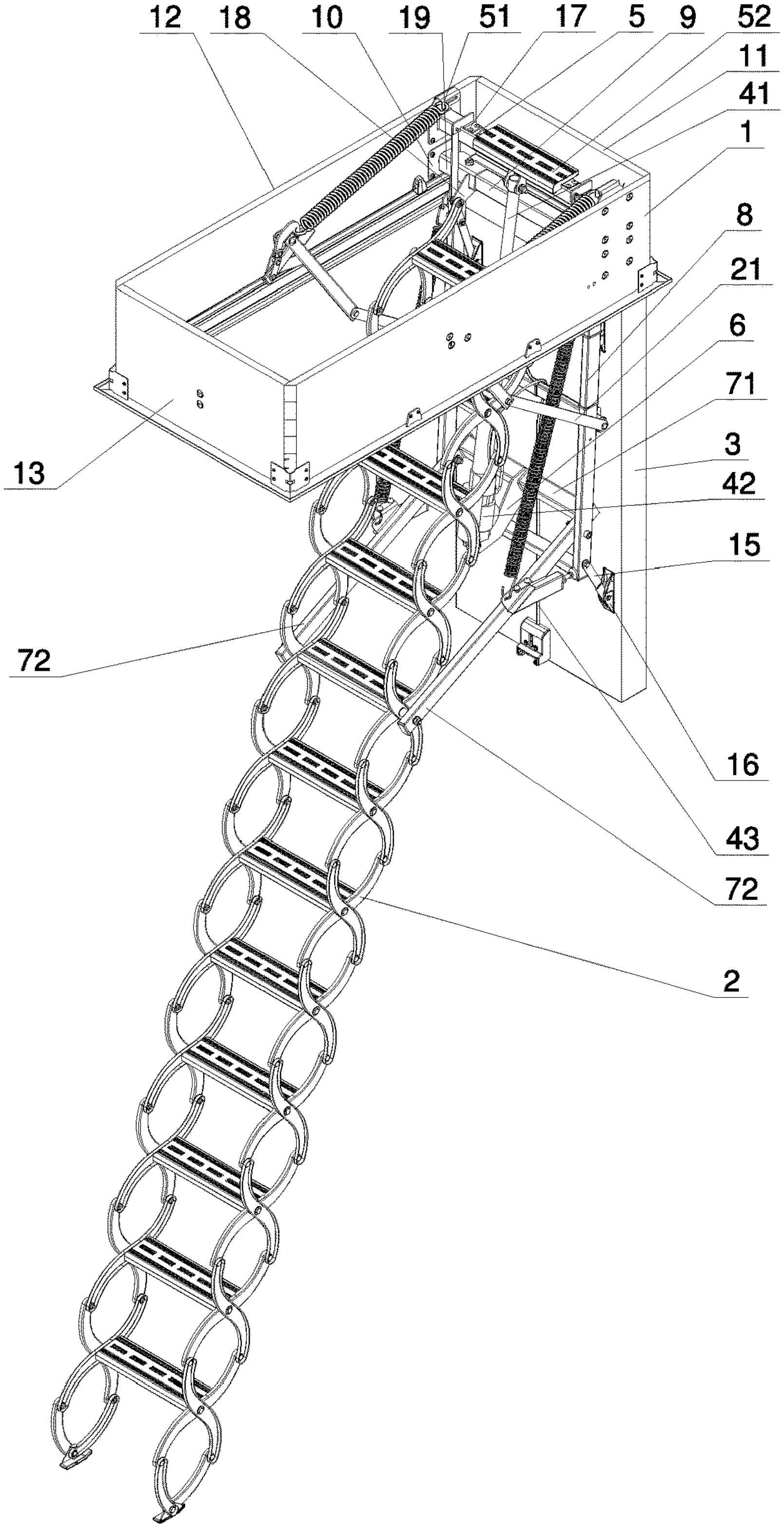
FIG. 1 is a spatial view of attic stairs.
Figure 2:
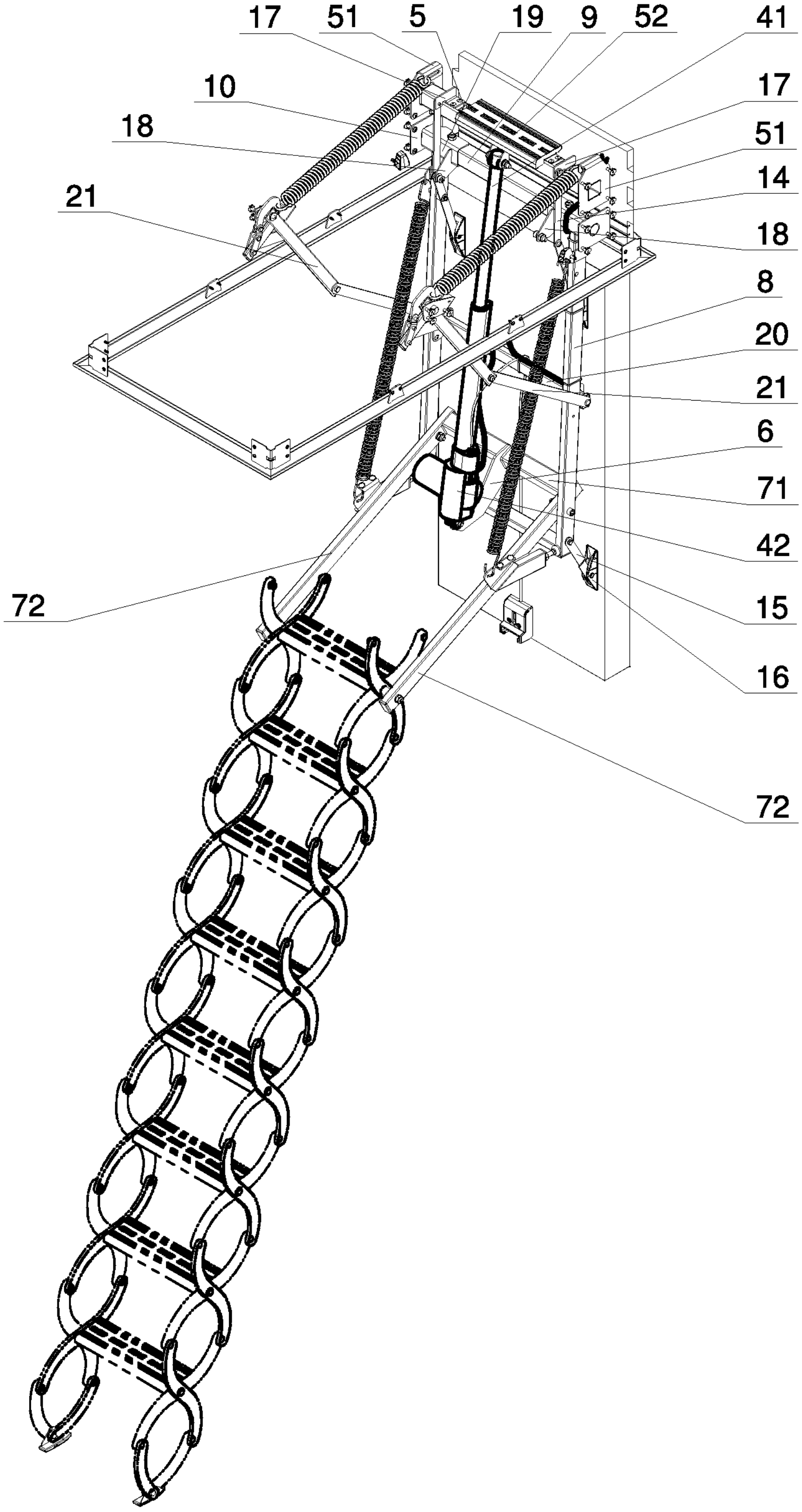
FIG. 2 is a spatial view of attic stairs without the box and top ladder section.
Figure 3A:
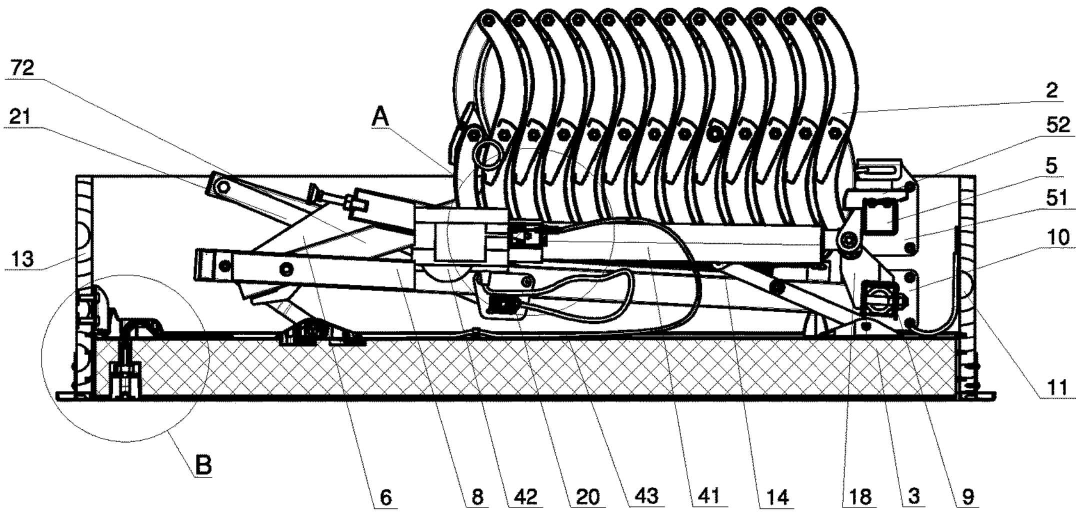
FIG. 3A is a spatial view of closed attic stairs.
Figure 3B:
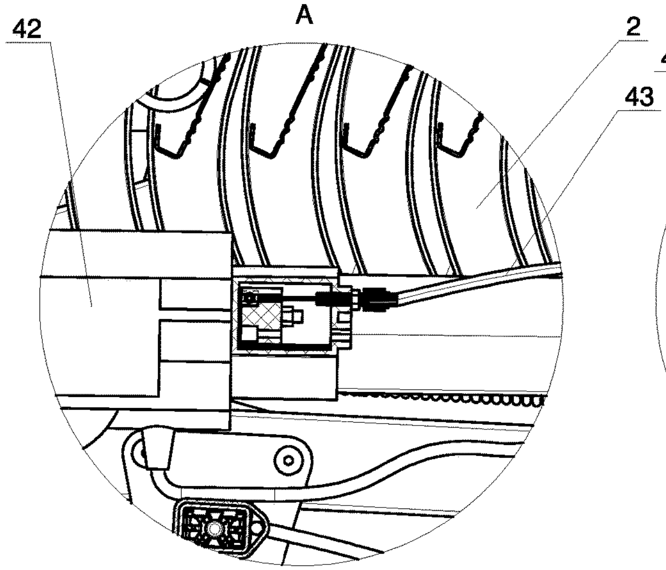
FIG. 3B is an enlarged view A of attic stairs depicted on FIG. 3A.
Figure 3C:
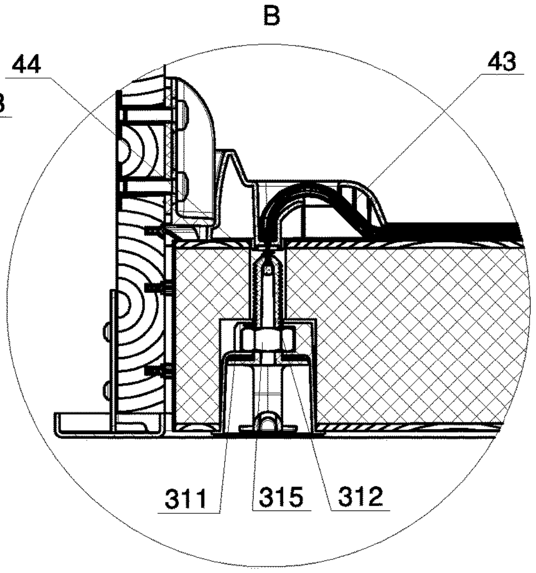
FIG. 3C is an enlarged view B of attic stairs depicted on FIG. 3A.
Figure 4:
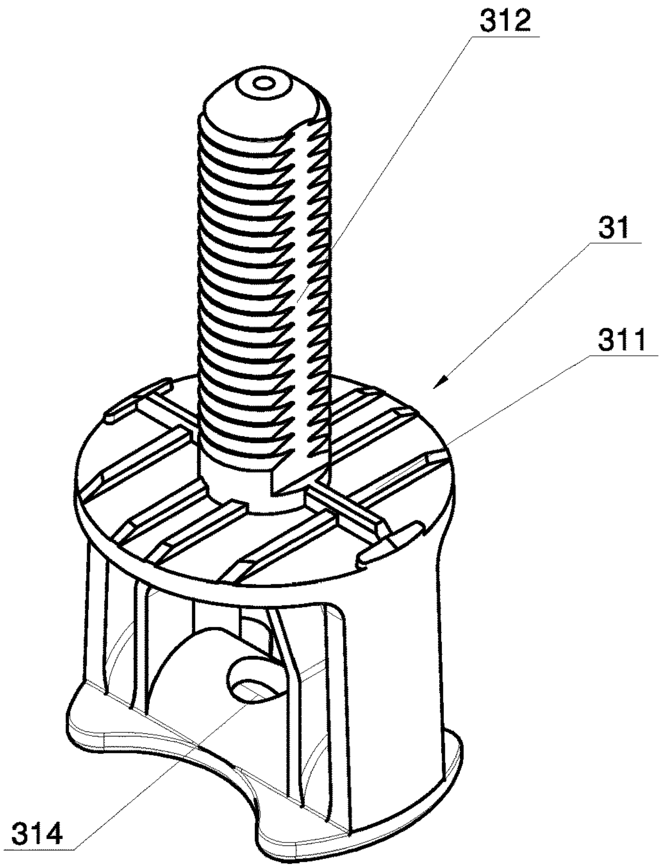
FIG. 4 is a vertical view of the bracket.
Figure 5:
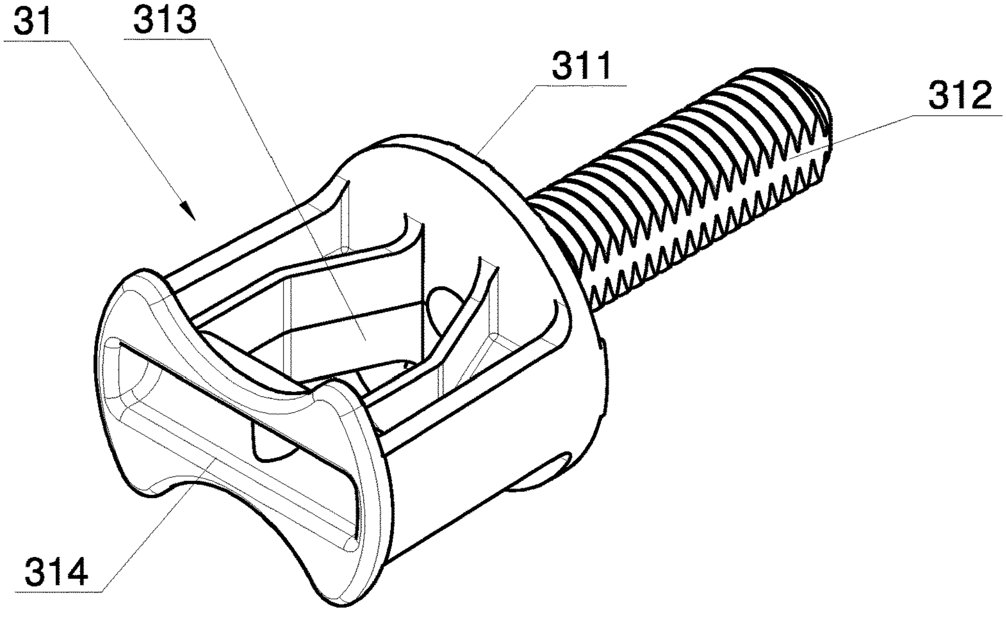
FIG. 5 is a horizontal view of the bracket.

An embodiment shall be presented for a box structure in the form of attic stairs. The attic stairs according to the invention are constructed out of box 1, with concertina ladder 2 at least partially retracted into it in a folded state, box 1 is closed from the bottom by closing hatch 3. The attic stairs box includes back wall 11, side walls 12 and front wall 13. The attic stairs are operated using a drive system which includes actuator 41 powered by electric motor 42. Drive system operation is controlled by a remote control. Electric motor 42 transfers motion to actuator 41 using a transmission. The drive system also features a coupler with coupler cable 43, which runs from the coupler to closing hatch 3 bracket 31. Coupler cable 43 terminates with ferrule 44. Bracket 31 base 311 divides it into two parts, one part is threaded 312 and the second part features bracket opening 313 and cavity 314 for rod 17 hook. Bracket 31 is extracted from the closing hatch socket with nut 315 by screwing it out using rod 17 hook, which is located on bracket cavity 314 constituting its contact surface. This tensions coupler cable 43 and causes drive system decoupling and the attic stairs become disconnected from electric motor 42. Rod 17 hook is removed from bracket 31 cavity 314 and inserted into opening 313. In such a position, closing hatch 3 may be pulled down to unfold the stairs manually. Whereas with the attic stairs operating in automatic mode, they are opened and closed using actuator 41. Drive system actuator 41 includes a piston attached to stairs load bearing beam 5 with step 52. Load bearing beam 5 is seated on load bearing beam assembly bases 51 which in turn are attached to box side walls 12. Load bearing frame 8 is supported by support beam 20 suspended using tie-rods 21 from attic stairs box side walls. The other end of actuator 41 is connected with half-frame lateral stile 71 via a coupling element in the form of hook 45. The half-frame also includes side stiles 72 connected telescopically with stairs load bearing frame 8. The half-frame axis of rotation relative to load bearing frame 8 runs through the aforementioned telescopic connection. Load bearing frame 8 includes an upper stile constituting ladder base 9 with concertina ladder 2 suspended from it. Ladder base assembly bases 10 with bearings on them are attached to box side walls 12. These bearings are inserted into ladder base 9 allowing it to rotate when opening and closing the stairs. There are base clamps 19 used to connect load bearing frame 8 with ladder base 9 by means of bolts at the ends of load bearing frame 8. Ladder connectors 18 are resting against base clamps 19. Whereas closing hatch 3 is suspended from box 1 using top suspension flat bars 14 and bottom suspension flat bars 15. To that end brackets 16 are located on closing hatch 3, which feature telescopically connected closing hatch suspension flat bars. Top suspension flat bars 14 connect the hatch to load bearing beam 5 using angle bars 17 whereas bottom suspension bars 15 connect closing hatch 3 to load bearing frame 8. When unfolding the attic stairs, a signal from controller 43 activated via a remote control is sent to electric motor 42 which starts operating. Electric motor 42 power is transferred via a transmission to actuator 41 rod pushing out its piston. In pushing out the piston, hook 6 presses into half-frame lateral stile 71 causing load bearing frame 8 to rotate and closing hatch 3 to open, and then subsequently the half-frame to rotate around an axis running through the telescopic connection between the half-frame and the load bearing frame. Then concertina ladder 2 is extended and also moved towards closing hatch 3, so that once the attic stairs are unfolded, closing hatch 3 and concertina ladder 2 are not parallel to one another. Closing hatch 3 together with the load bearing frame and closing hatch suspension flat bars form a four-bar linkage.

What is claimed is:

1. A box structure building partition comprising a box designed for mounting in a building partition, a closing hatch articulated relative to the box, wherein the box structure comprises a closing hatch locking mechanism in the box and the closing hatch comprises a bracket in a closing hatch socket for unlocking the closing hatch locking mechanism, wherein the bracket assumes first and second extreme positions in the closing hatch socket, wherein the bracket in the first extreme position is retracted into the closing hatch socket and the closing hatch locking mechanism is locked and in the second extreme position, the bracket is screwed out from the closing hatch socket and the closing hatch locking mechanism is unlocked and the bracket comprises a coupling for a coupling element, accessible for a user when the bracket is not in its first extreme position;

wherein movement of the bracket between the first and second extreme positions takes place by screwing the bracket in or out of the closing hatch socket using the coupling element; and wherein at least an external surface part of the bracket and a closing hatch socket surface are threaded, wherein the closing hatch socket surface holds the bracket.

2. The box structure according to claim 1, wherein the bracket comprises a contact surface, accessible in each bracket position for the coupling element making it possible to screw the bracket out from its first extreme position.

3. The box structure according to claim 1, wherein the closing hatch socket for the bracket comprises a nut for a threaded part of the bracket.

4. The box structure according to claim 1, wherein the bracket comprises a base, wherein the base divides the bracket into a threaded part and a part with the coupling for the coupling element, wherein the base in the second extreme position of the bracket is flush with a closing hatch external surface.

5. The box structure according to claim 4, wherein the base comprises stop faces working together with closing hatch socket stop faces, the stop faces guide the bracket to the first extreme position.

6. The box structure according to claim 1, wherein the closing hatch locking mechanism is a subassembly of a box structure closing hatch drive system, wherein the closing hatch locking mechanism comprises at least a coupler and a coupler cable fastened to the bracket, and with the bracket out of the first extreme position, the box structure closing hatch drive system is decoupled, and the closing hatch locking mechanism is unlocked.

7. The box structure according to claim 6, wherein there is an opening in the bracket for the coupler cable terminating with a ferrule.

8. The box structure according to claim 6, wherein the box structure closing hatch drive system further comprises an actuator powered by an electric motor, a transmission, and a drive system operation is controlled by a controller in the box operated using a remote controller.

9. The box structure according to claim 1, wherein the box structure comprises a ladder, suspended on a ladder base, wherein the ladder base is attached to box side walls, and the closing hatch comprises brackets on the bottom for closing hatch top and bottom suspension flat bars, wherein top suspension flat bars, with a box structure open, are more adjacent to the box than the bottom suspension flat bars, a load bearing frame where its lateral upper stile constitutes the ladder base, a support beam located between the closing hatch and the load bearing frame and where the support beam is suspended via tie-rods from the box side walls.

10. The box structure according to claim 9, wherein the closing hatch is suspended from the load bearing frame via the bottom suspension flat bars, and from a load bearing beam via the top suspension flat bars.

11. The box structure according to claim 10, wherein the box structure comprises the load bearing beam, attached to attic stairs box side walls and that the box structure closing hatch drive system is suspended from the load bearing beam.

12. The box structure according to claim 11, wherein the load bearing beam is above the ladder base.

13. The box structure according to claim 11, wherein the box structure comprises a half-frame with two side stiles connected by a half-frame lateral stile, wherein the side stiles are attached telescopically to the load bearing frame and to the ladder, wherein the box structure closing hatch drive system is located between the load bearing beam the box structure closing hatch drive system is attached to and the half-frame lateral stile, and a coupling element located between the box structure closing hatch drive system and the half-frame lateral stile changes a position of the ladder relative to the load bearing frame as a result of a power system operation.

14. The box structure according to claim 11, wherein there are assembly bases for load bearing beam ends on the box side walls.

15. The box structure according to claim 11, wherein there are assembly bases with bearings for the ladder base on the box side walls.

16. The box structure according to claim 2, wherein the bracket comprises a base, wherein the base divides the bracket into a threaded part and a part with the coupling for the coupling element, wherein the base in the second extreme position of the bracket is flush with a closing hatch external surface.

17. The box structure according to claim 1, wherein the bracket comprises a base, wherein the base divides the bracket into a threaded part and a part with the coupling for the coupling element, wherein the base in the second extreme position of the bracket is flush with a closing hatch external surface.

* * * * *